United States Patent [19]
Braun

[11] Patent Number: 5,532,737
[45] Date of Patent: Jul. 2, 1996

[54] CAMERA ARRANGEMENT WITH WIDE FIELD OF VIEW

[75] Inventor: David A. Braun, Denville, N.J.

[73] Assignee: Bell Communications Research, Inc., Morristown, N.J.

[21] Appl. No.: 255,839

[22] Filed: Jun. 7, 1994

Related U.S. Application Data

[63] Continuation of Ser. No. 56,972, May 3, 1993, abandoned.

[51] Int. Cl.$^6$ ..................................... H04N 7/18
[52] U.S. Cl. ........................... 348/36; 348/159; 348/218
[58] Field of Search ................................ 348/218, 335, 348/343, 15, 143, 148, 150, 151, 157, 159, 36

[56] References Cited

U.S. PATENT DOCUMENTS

| | | | |
|---|---|---|---|
| 3,697,678 | 10/1972 | Belleson | 178/6.6 DD |
| 4,288,819 | 8/1981 | Williams | 348/343 |
| 4,355,328 | 10/1982 | Kulik | 358/87 |
| 4,400,727 | 8/1983 | Aron | 358/103 |
| 4,613,898 | 9/1986 | Bagnall-Wild et al. | 358/87 |
| 4,640,588 | 2/1987 | Tanaka | 359/384 |
| 4,673,973 | 6/1987 | Ledley | 348/335 |
| 4,797,942 | 1/1989 | Burt | 382/41 |
| 4,847,693 | 7/1989 | Eppolito | 348/343 |
| 4,890,314 | 12/1989 | Judd et al. | 358/87 |
| 5,016,109 | 5/1991 | Gaylord | 348/218 |
| 5,023,725 | 6/1991 | McCutchen | 358/231 |
| 5,181,122 | 1/1993 | Ooiski | 348/779 |
| 5,187,571 | 2/1993 | Braun et al. | 358/85 |

FOREIGN PATENT DOCUMENTS 0194788 8/1990 Japan.

*Primary Examiner*—Tommy P. Chin
*Assistant Examiner*—A. Au
*Attorney, Agent, or Firm*—Leonard Charles Suchyta; James W. Falk

[57] ABSTRACT

A camera arrangement (100) comprises first and second sets of one or more cameras (102, 104, 202, 204, 204') and a half-silvered mirror (130). The one or more cameras of the first set look through the half-silvered mirror—i.e., receive light that passes through the half-silvered mirror. The one or more cameras of the second set look off the half-silvered mirror (130)—i.e., receive light reflected off the half-silvered mirror. The cameras of the first and second sets are positioned so that individual fields of view (103, 105, 203, 205, 205') of the cameras of the first and second sets alternate to form a wide angle aggregate field of view (110, 210). The field of view of each individual camera merges contiguously along a boundary with the field of view of a camera from the other set. This permits cameras which form adjacent sections of the wide angle field of view to be located at physically separate locations in space yet have individual fields of view which appear to originate at the same physical location in space. An additional mirror (160, 160') may be associated with each camera of the second set to provide a second reflection of the light received by the cameras of the second set to avoid image reversal. There are no mirror edges within the aggregate wide angle field of view. Thus, there are no artifacts in the high resolution image produced by the camera arrangement at the boundaries of the sub-images produced by the individual cameras.

15 Claims, 7 Drawing Sheets

CAMERA ARRANGEMENT WITH WIDE FIELD OF VIEW

This is a continuation of application Ser. No. 08/056,972 filed May 3, 1993, now abandoned.

FIELD OF THE INVENTION

The present invention relates to an arrangement of cameras having individual fields of view which merge contiguously with one another to form an aggregate wide angle field of view. The inventive arrangement of cameras produces a combined image which does not have a seam at the boundary between two individual sub-images produced by individual cameras.

BACKGROUND OF THE INVENTION

Since the beginning of wire, and later wireless, communications, an implicit goal of communications systems has always been to bring remotely located participants as close together as possible. This is also the goal of a traditional teleconferencing system. Ideally, the effect obtained in good communications should be one of "being there."

A conventional teleconferencing system comprises two or more stations which are illustratively connected via the public switched telephone network. At each station, there is a camera for transmitting a video image to a remote station. There is also a microphone for picking up sound and forming an audio signal for transmission to the remote station. The typical teleconferencing station also includes a video monitor for receiving a video signal from the remote station to produce an image of a conferee at the remote station and a speaker for receiving an audio signal from the remote station.

In most teleconferencing systems, the video camera at a sending station is an NTSC camera which has a limited field of view. This camera forms an image on a conventional NTSC monitor at a receiving station remotely located relative to the sending station. One problem with this arrangement is that the conventional NTSC monitor is relatively small-sized. When the number of teleconference participants at the sending-end of a teleconference is larger than one, the image of each participant occupies a small portion of a small viewing area on the receiving monitor. As a result it becomes difficult for viewers at the receiving end of such an image to pick up non-verbal cues from the speaker's body and face. Indeed, in many cases it is often difficult to discern at the receiving-end who of the many participants at the sending-end is actually speaking.

U.S. Pat. No. 4,890,314, the contents of which are incorporated herein by reference, discloses a teleconferencing station which solves one aspect of this problem. In particular, in accordance with U.S. Pat. No. 4,890,314, a transmitting teleconferencing station includes, for example, first and second cameras which are specially arranged through the use of mirrors to have contiguous fields of view over a range of distances from the cameras. The two cameras produce first and second video signals corresponding to first and second sub-images. At the receiving teleconferencing station, the two sub-images are displayed using a display device so that the two sub-images merge contiguously to form a single high resolution image. The cameras at the transmitting station collectively have a larger field of view than a single camera would have, and, at the receiving-end, a much larger image is formed than would be the case if a conventional NTSC monitor were to be utilized.

A problem with this approach to forming a camera system with an aggregate wide area field of view is that there is a "seam" between the individual sub-images of the individual cameras when the individual sub-images are combined to form a single high resolution image. The seam appears because mirror edges are located just within the boundaries of the fields of view of the individual cameras.

In view of the foregoing, it is an object of the present invention to provide an arrangement of video cameras having individual fields of view which merge contiguously with one another to form an aggregate wide angle field of view and which produces a single high resolution image that does not exhibit a seam or other artifact at the boundary between the sub-images produced by the individual cameras.

SUMMARY OF THE INVENTION

In a preferred embodiment of the invention, a camera arrangement comprises first and second sets of one or more cameras and a half-silvered mirror. The one or more cameras of the first set look through the half-silvered mirror—i.e., receive light that passes through the half-silvered mirror. The one or more cameras of the second set look of the front or objective side of the half-silvered mirror—i.e., receive light reflected off the half-silvered mirror. The cameras of the first and second sets are positioned so that individual fields of view of the cameras of the first and second sets alternate to form a wide angle field. The field of view of each individual camera merges contiguously along a boundary with the field of view of a camera from the other set. This permits cameras which form adjacent sections of the wide angle field of view to be located at physically separate locations in space, yet have individual fields of view which appear to originate at the same physical location in space.

An additional mirror may be associated with each camera of the second set to provide a second reflection of the light received by the cameras of the second set to avoid image reversal and to permit the cameras of the second set to be physically separated from each other. If there is more than one camera in the first set additional mirrors are used to physically separate these cameras from one another.

There are no mirror edges within the aggregate wide angle field of view. Thus, there are no artifacts in the high resolution image produced by the camera arrangement at the boundaries of the sub-images produced by the individual cameras.

DETAILED DESCRIPTION OF THE INVENTION

Figure 1:
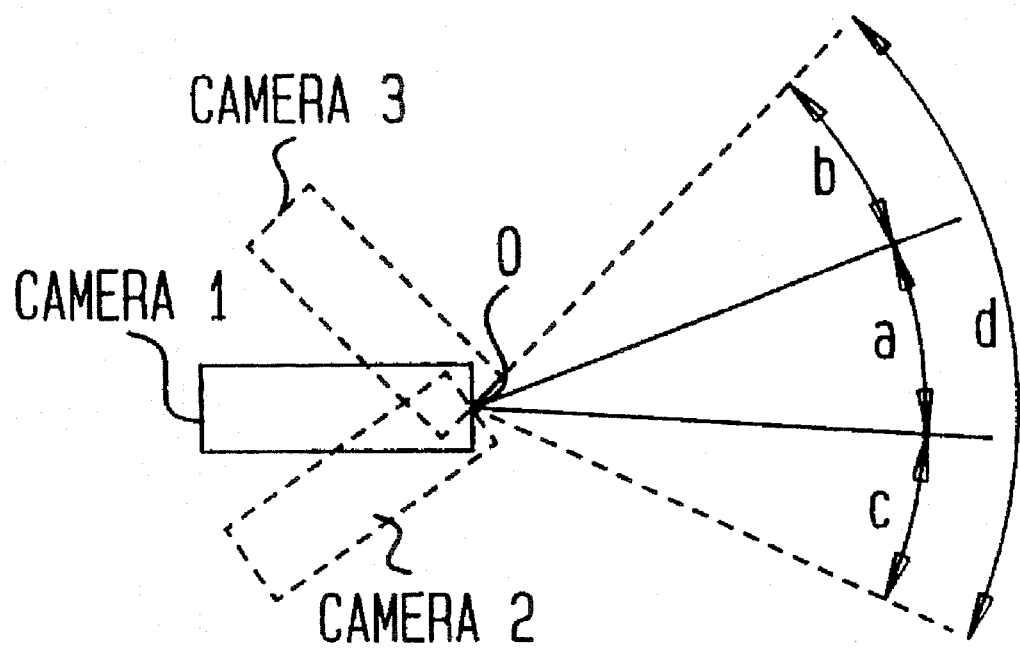
FIG. 1 schematically illustrates the difficulty in arranging a sequence of cameras with contiguous fields of view.

FIG. 1 schematically illustrates the difficulty in arranging a plurality of video cameras to have contiguous fields of view. In FIG. 1, the horizontal field of view of video camera 1 is labeled a, the horizontal field of view of video camera 2 is labeled b, and the horizontal field of view of video camera 3 is labeled c. The fields of view of the three cameras are contiguous over a range of distances from the cameras and merge together to form an aggregate field of view labeled d. However, in order for the fields of view a, b, c to be contiguous, the corresponding cameras 1, 2, 3 must all be located at the common vertex O of the three fields of view. As shown in FIG. 1, this is physically impossible, since it is not possible for all three cameras to occupy the same position in space. Thus, to achieve contiguous fields of view, it is not possible to simply place a sequence of cameras one next to the other.

Figure 1A:
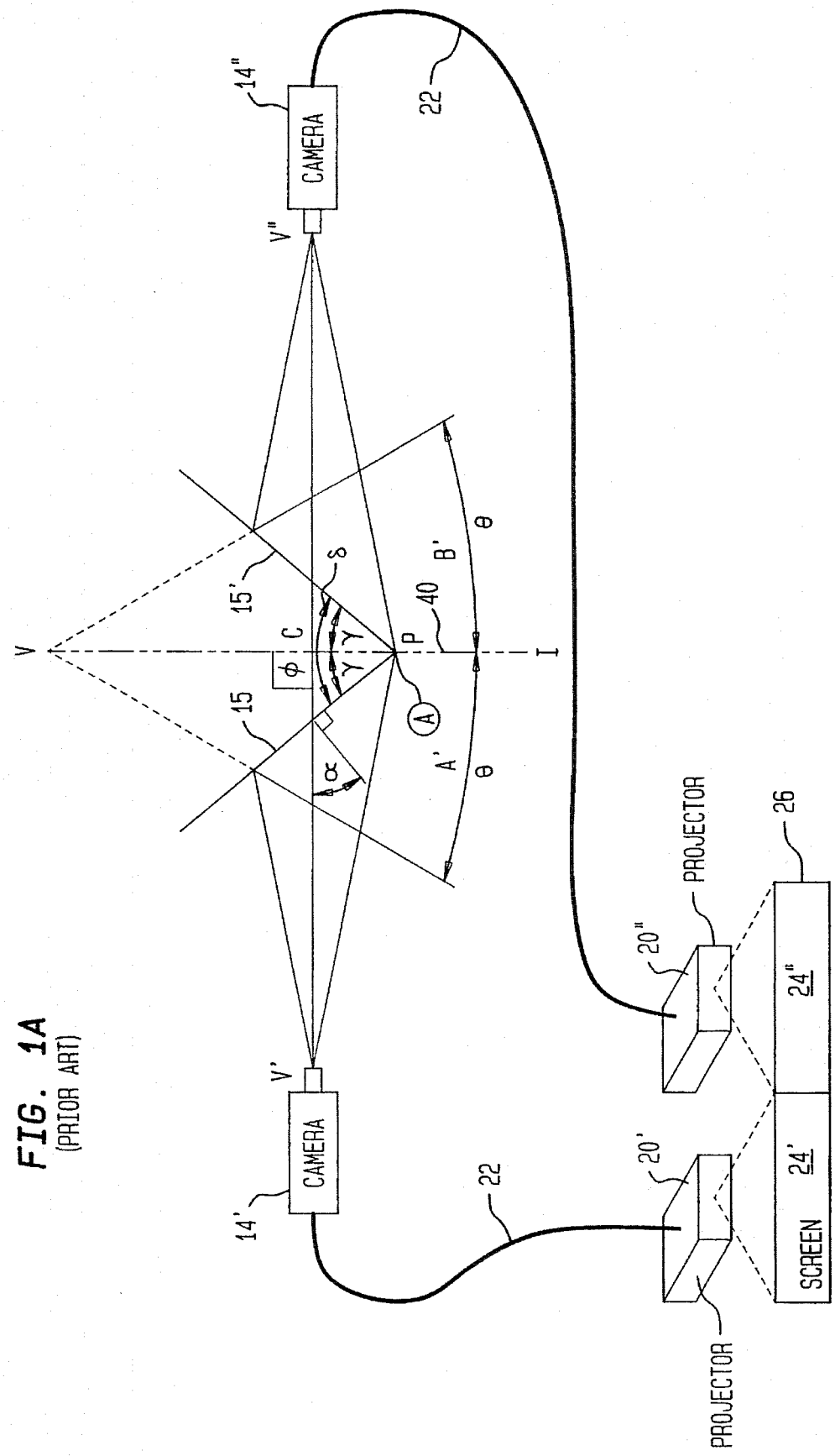
FIGS. 1A and 1B illustrate a prior art technique for arranging a plurality of video cameras with contiguous fields of view.

As indicated above, one solution to this problem is described in U.S. Pat. No. 4,890,314. This solution is illustrated herein in FIG. 1A. In FIG. 1A, the camera 14' and 14" are located at point V' and V", respectively each of the cameras 14' and 14" has a lens that has an angle acceptance of $\Theta$. The optical axis V'CV" is perpendicular to the system center line CI. A mirror 15 is placed at angle $\gamma$ to CI such that the outermost ray V'P is deflected to coincide with the center line CI. Similarly, a mirror 15' is placed at an angle $\gamma$ to CI such that the outermost ray V"P is deflected to coincide with the center line CI. Using $\phi=90°$ geometric analysis reveals that $$\alpha = \frac{90° - \Theta/2}{2} \text{ and that } \alpha = \gamma$$

where $\alpha$ is the angle of incidence of the central rays from the points V', V" Further, define $\delta$ to equal total angle between the two mirrors in the complete system, $\delta=2\gamma$, so $\delta=90-\Theta/2$ where $\Theta$ is the acceptance angle of the camera lenses.

Illustratively, $\Theta/2=15.4°$ Thus, the two cameras 14', 14" of FIG. 1A will produce the desired contiguous fields of view if pointed at mirrors separated by angle $\delta=90°-15.4°=74.6°$. With this geometry, the horizontal field of view A' of camera 14' and the horizontal field of view B' of camera 14" are exactly contiguous at all relevant distances. Both fields of view appear to originate from point V in FIG. 1A. Referring again to FIG. 1A, note that each camera 14', 14" has a projector 20', 20" associated therewith The cameras and projectors may be separated by a teleconference link schematically represented by the lines 22. The projectors form two adjoining images 24' and 24" on two adjoining portions of a display device 26 to form a single high resolution video image.

The two cameras 14', 14" of FIG. 1A, each with lenses having angle of acceptance $\Theta$ will produce images 24', 24" that can be projected side-by-side with an apparent acceptance angle of $2\Theta$. If each camera has an aspect ratio of 4:3, the resulting image will have aspect ratio 8:3. The important principle here is: given two image sensors of state-of-the art resolution, the horizontal resolution can be doubled by combining them in the manner of FIG. 1A.

Note that in the arrangement of FIG. 1A the images of the two cameras 14' and 14" will be reversed left to right because of the mirrors 15, 15'. This can be solved by modifying the cameras 14', 14" or the projectors 20', 20" to reverse their scans.

Figure 1B:
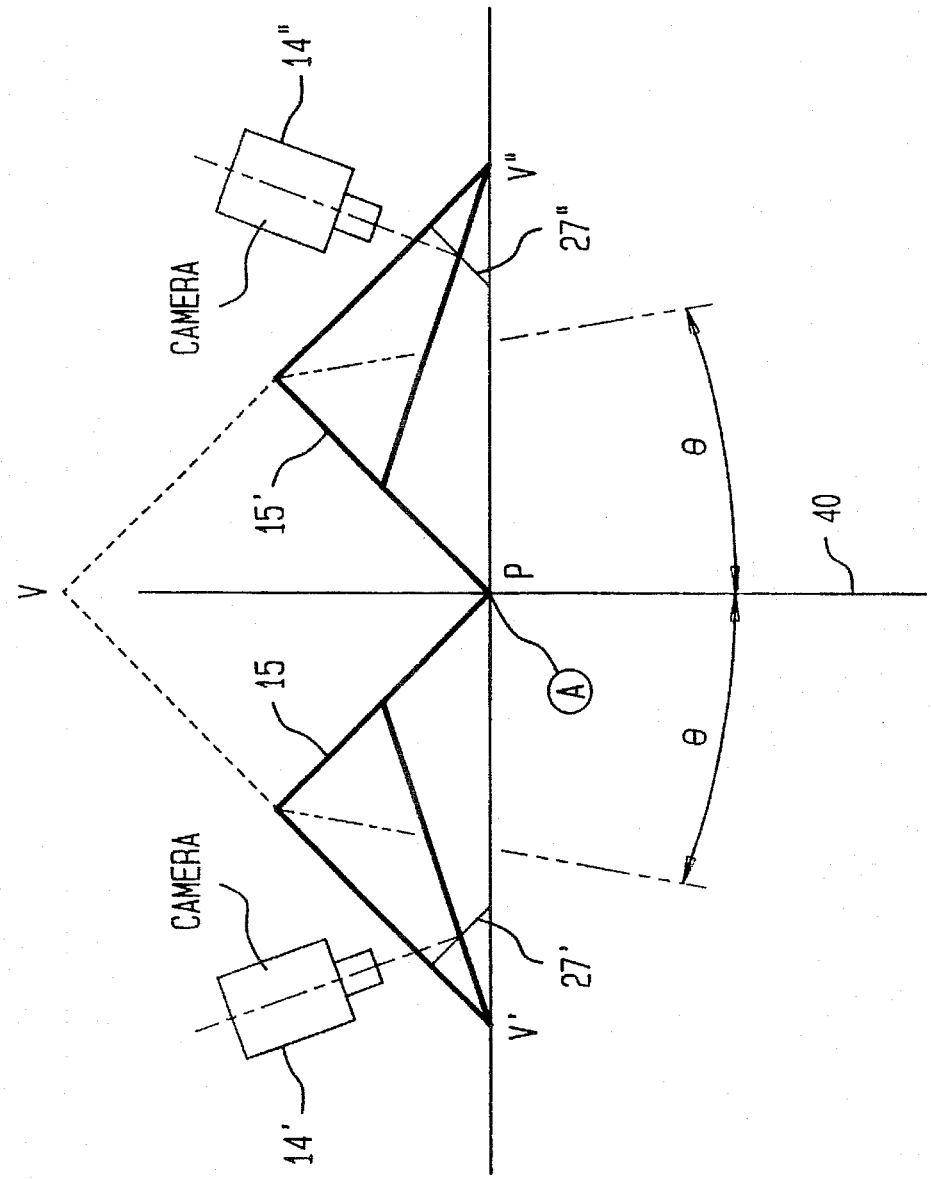

As shown in FIG 1B, the image reversal problem caused by the mirrors 15, 15' can be solved through use of the mirrors 27', 27" which are oriented at an angle of 45° to the line V'PV" Thus, in FIG 1B, the cameras 14', 14" have locations equivalent to the locations V', V" except that there are now two image reversals provide by the mirrors 27', 27" and 15, 15" to provide a net effect of no reversal. Note that the fields of view provided by the two cameras are entirely contiguous over all distances of interest and appear to originate from point V.

A first problem with the system of FIGS. 1A and 1B is that it is difficult to add more cameras so as to further increase the horizontal size of the field of view from $2\Theta$ shown in FIGS. 1A and 1B to a larger size.

A second problem with the system of cameras illustrated in FIGS. 1A and 1B is that there is a seam at the center of the combined field of view of the two cameras 14', 14" along the line 40 where the fields of view of the two cameras meet. This seam manifests itself as a defect or artifact in the combined image of the two cameras. The defect generally manifests itself as a dark bar in the image corresponding to the location of the seam.

The cause of the problem is the mirror corner designated "A" in FIGS. 1A and 1B. The mirrors 15, 15' cannot be placed so as to catch complete ray bundles coming from an object in the field of view at the seam. The mirrors would have to cross each other, a physical impossibility, rather than terminate in the corner A. The final result is that the mirror corner A reduces the effective aperture of each camera near the seam, reducing the brightness of the image in that region. In short, the problem is caused by the edges of mirrors 15 and 15' being placed directly in the combined field of view of the two cameras 14', 14". The arrangement of cameras and mirrors of the present invention, as discussed in connection with FIGS. 2, 3A, 3B, and 4 below solves this problem by eliminating the mirror edges from the combined field of view of the cameras.

Figure 2:
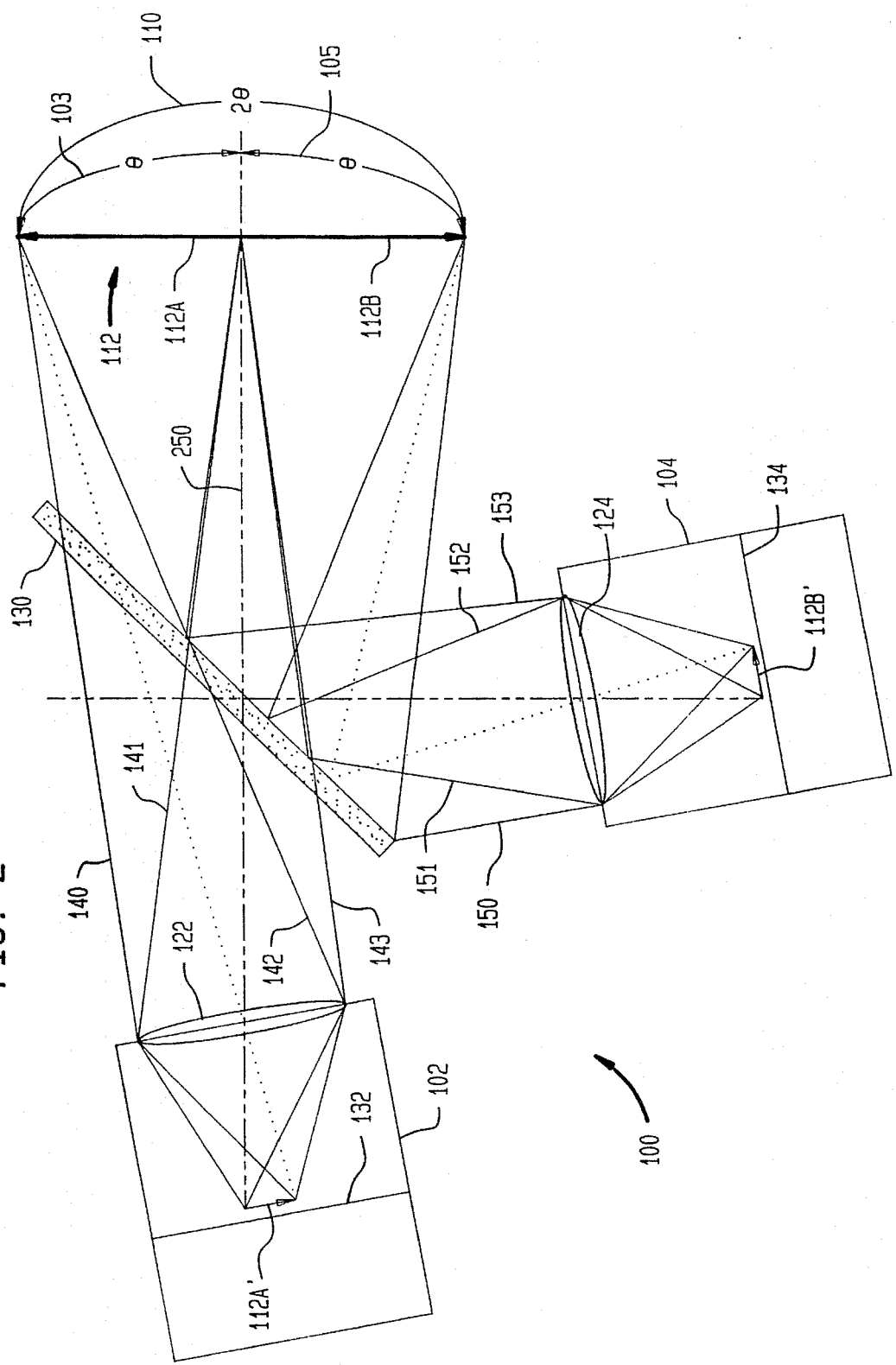
FIG. 2 illustrates a pair of cameras and an associated half-silvered mirror arranged so that the cameras have contiguous fields of view in accordance with the present invention.

FIGS. 2, 3A, 3B and 4 illustrate an arrangement 100 of cameras and mirrors which achieves a contiguous wide angle field of view in accordance with the present invention. The advantage of the arrangement is that there are no mirror edges in the field of view of any of the cameras and no resulting artifacts in the resulting combined image. FIG. 2 illustrates two video cameras 102 and 104 which lie in the same horizontal plane. Each camera 102, 104 has a horizonal field of view 103, 105 of width $\Theta$ and the combined field of view 110 is $2\Theta$. An object 112 is located in the combined field of view. The object has two halves 112A and 112B. Each camera 102, 104 is schematically illustrated as comprising a lens 122, 124 and an imaging device, such as a CCD imager, 132, 134.

The mirror 130 is a half-silvered mirror. The camera 102 receives light which passes through the half-silvered mirror and the camera 104 receives light which reflects off the half-silvered mirror. In other words, the camera 102 may be viewed as "looking through" the half-silvered mirror 130 and the camera 104 may be viewed as "looking off" the half-silvered mirror 130. The half-silvered mirror is oriented at 45° to the line 250 which bisects the combined field of view 110.

FIG. 2 shows how the rays 140, 141, 142, 143 coming from the object portion 112A in the field of view 103 pass through the half-silvered mirror 130 and are focused by the lens 122 to form the image 112A' on the imaging device 132 of the camera 102. Similarly, the rays 150, 151, 152, 153 coming from the object portion 112B in the field of view 105 are reflected by the half-silvered mirror 130 and are focused by the lens 124 to form the image 112B' on the imaging device 134 of the camera 104.

The cameras 102 and 104 may be positioned manually or automatically so that the fields of view 103 and 105 are merged contiguously to form the combined horizontal field of view 110. Note that there is no mirror edge or corner in the field of view of either cameras. Thus there is no seam when a combined image is formed from the separate images formed by the two cameras 102, 104. The arrangement permits the individual fields of view of the two cameras 102, 104 to be contiguous over a range of distances and to appear to originate at the same location in space, yet the cameras have physically separate locations.

Instead of using a half-silvered mirror 130 in the arrangement of FIG. 2, an alternative device which receives the light coming from the object 112 may be used. Such a device may be for example a polarizing beam splitter. Thus, the camera 102 may receive light of one polarization which originates in the field of view 103 and passes through the polarizing beam splitter. The camera 104 may receive light of the other polarization which originates in the field of view 105 and which is reflected by the polarizing beam splitter. The general principle is the device 130—be it a half-silvered mirror or polarizing beam splitter—divides the light combing from the field of view 112 into two portions so that the cameras 102, 104 can be at different physical locations.

It should be noted that the image of the camera 104 is reversed left to right because of reflection off of the half-silvered mirror 130. This can be solved by modifying the camera 104 to reverse its scan or by modifying the projector (not shown) which displays the image formed by the camera 104 to reverse the scan direction of the projector. Alternatively, a second mirror can be introduced in the optical path of the camera 104 to achieve an additional reflection which cancels the reversal caused by the half-silvered mirror 130.

Figure 3A:
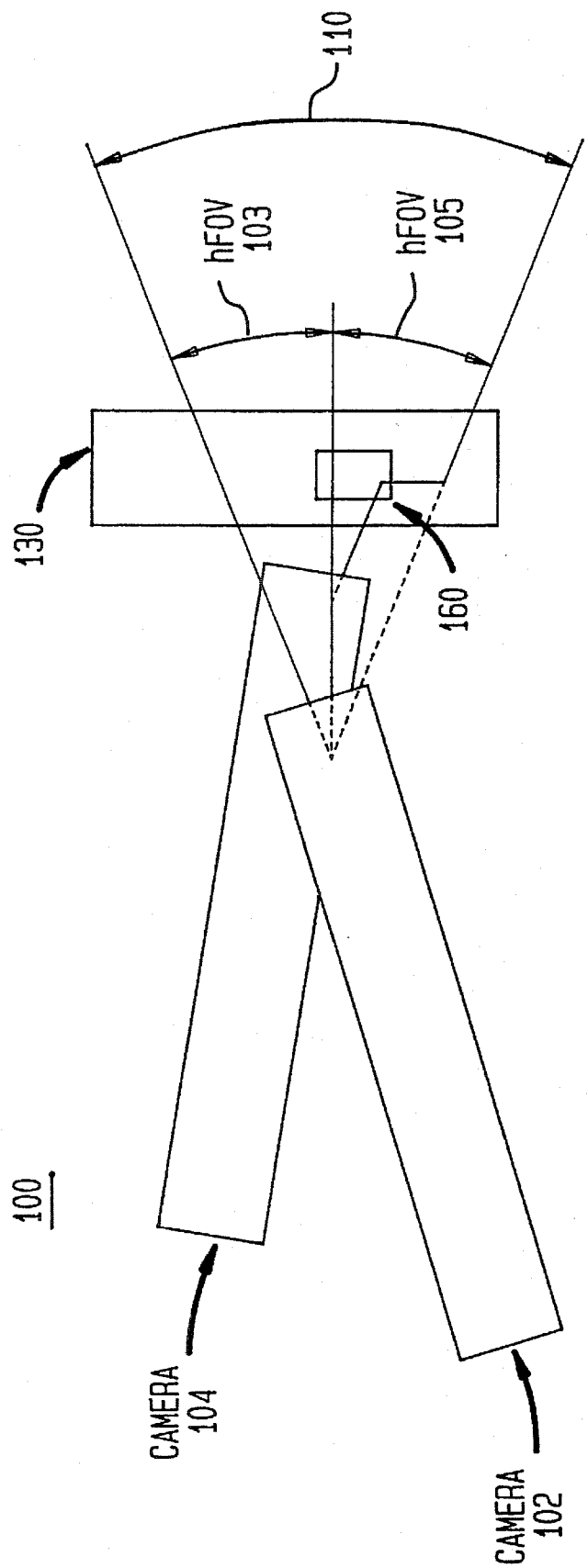
FIGS. 3A and 3B illustrate an alternative embodiment of the arrangement of FIG. 2 in accordance with the invention.
Figure 3B:
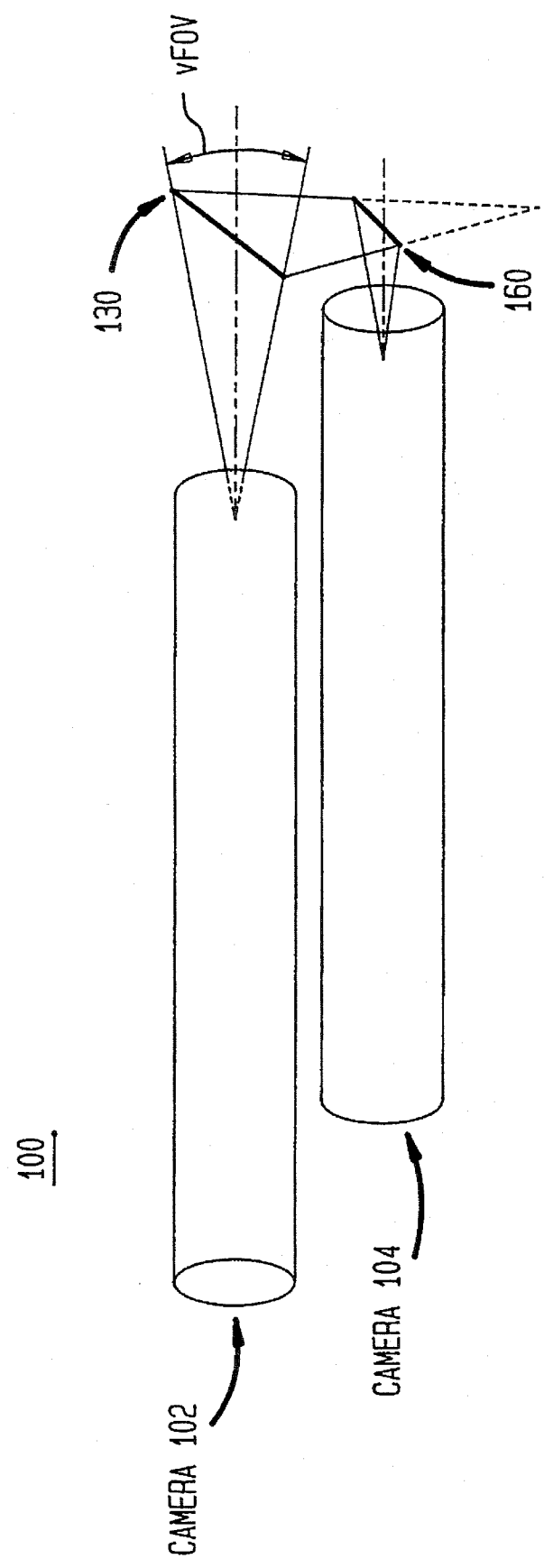

An arrangement including such an additional mirror is shown in FIGS. 3A and 3B. FIG. 3A shows a top view of such an arrangement and FIG. 3B shows a side view of such an arrangement. In FIGS. 3A and 3B, the cameras 102 and 104 are no longer in the same horizontal plane. Instead, the camera 102 is located above the camera 104. However, the horizontal fields of view (hFOV) 103, 105, and combined field of view 110 have the same relationship in FIGS. 3A and 3B as in FIG. 2. In addition, the half-silvered mirror 130 serves the same purpose in FIG. 3A and 3B as in FIG. 2. Specifically, the half-silvered mirror 130 divides the light coming from the field of view 130 so that the cameras 102, 104 can be at different physical locations. As shown in FIG. 3B, the vertical fields of view (vFOV) of the two cameras 102, 104 are coextensive.

In FIGS. 3A and 3B, the additional mirror 160 is added. The mirror 160 is, for example, located below and parallel to the mirror 130. The mirror 160 provides a second reflection for light reflected off the half-silvered mirror 130 to avoid the image reversal problem.

Figure 4:
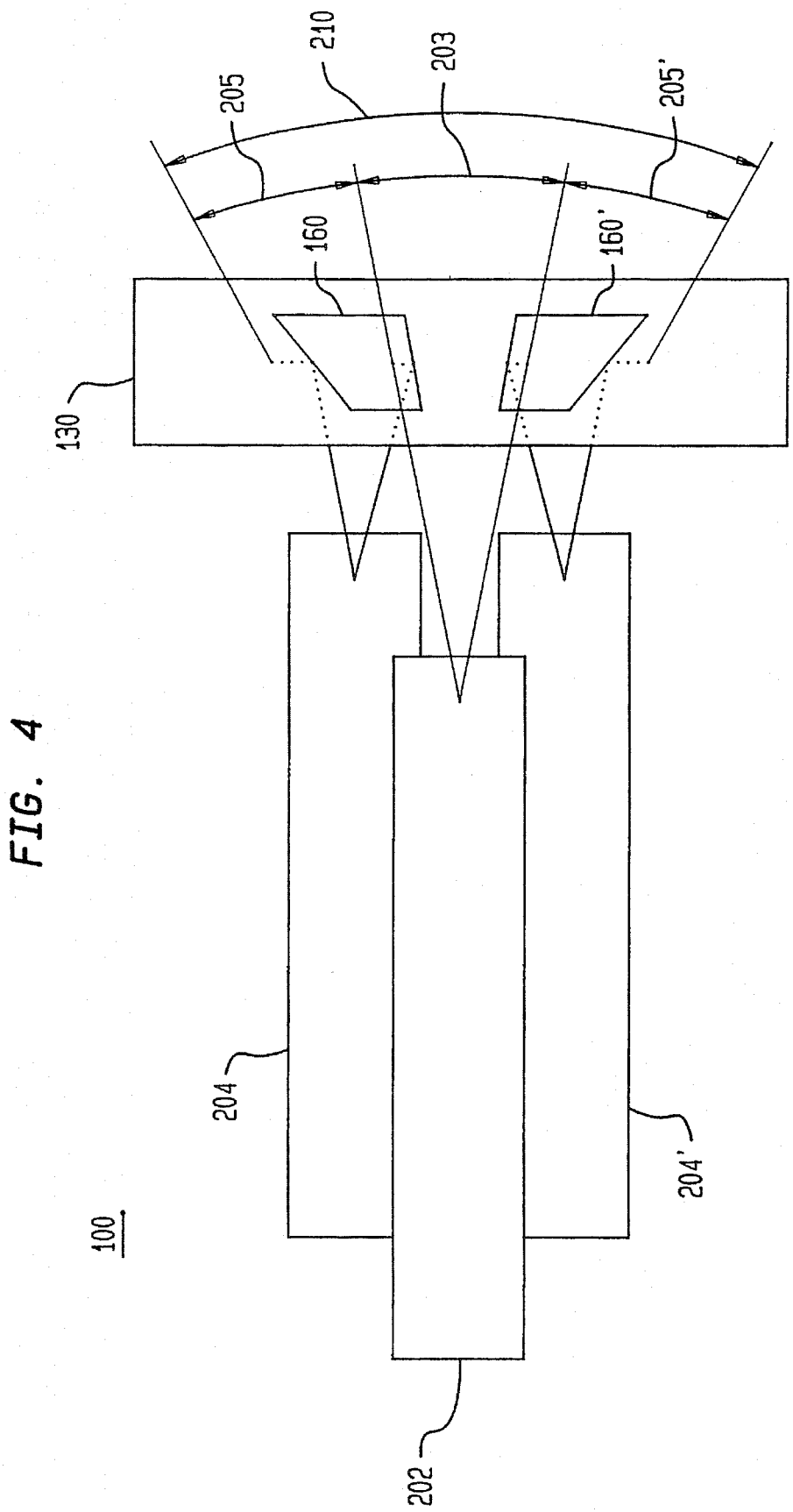
FIG. 4 illustrates an embodiment of the invention wherein more than two cameras are utilized.

FIG. 2, FIG. 3A and FIG. 3B illustrate an arrangement comprising only two cameras. However, additional cameras may be used to increase the horizontal field of view up to about 140°. Such an arrangement is illustrated in FIG. 4, which shows a three cameras example. A first camera 202 located in an upper plane looks through the half-silvered mirror 130. A set of cameras 204, 204' is located in a lower plane. The cameras 204, 204' in the second set look off the half-silvered mirror 130. An additional mirror 160, 160' is associated with each of the cameras 204, 204' in the lower plane to provide a second reflection to avoid image reversal and to enable the cameras 204, 204' to be physically separate. The aggregate field of view 210 is formed by the individual fields of view 205', 203 205 of the cameras 204', 202, 204 These fields of view merge contiguously to form a single wide angle field of view. It should be noted that if more than one camera is located in the upper plane additional mirrors would be needed to enable these cameras to be physically separate. In this case two mirrors may be associated with each camera in the upper plane, with the second mirror removing the image reversal caused by the first mirror.

In short, in connection with FIGS. 2, 3A, 3B, and 4 an arrangement of video cameras and mirrors has been disclosed wherein the fields of view of the individual cameras merge contiguously with one another to form an aggregate wide angle field of view. The aggregate wide angle field of view produces a single high resolution image that does not exhibit a seam or other artifact at the boundaries where the sub-images from the individual cameras merge. The reason is that there are no mirror edges inside the aggregate wide angle field of view.

Finally, the above-described embodiments of the invention are intended to be illustrative only. Numerous alternative embodiments may be devised by those skilled in the art without departing from the spirit and scope of the following claims.

I claim:

1. A video camera arrangement comprising a plurality of individual video cameras having individual fields of view which merge contiguously to form a single aggregate field of view, said arrangement comprising, a mirror for receiving incident light, for allowing a portion of said incident light to pass through without reflection, and for reflecting a portion of said incident light, a first set of one or more video cameras having individual fields of view for receiving at least some of the light passed through said mirror, a second set of one or more video cameras having individual fields of view for receiving at last some of the light reflected by said mirror, the cameras in said first and second sets being positioned so that the aggregate field of view is formed by alternating the individual fields of view of the individual cameras of the first and second sets, the field of view of each camera of each set merging continuously along a boundary with a field of view of a camera of the other set.

2. The video camera arrangement of claim 1 wherein said mirror is a half-silvered mirror.

3. The video camera arrangement of claim 1 wherein said mirror is a beam splitter.

4. The arrangement of claim 1 further including means for providing a second reflection for said portion of said light reflected by said mirror to avoid image reversal in said camera of said second part.

5. The arrangement of claim 4 wherein said means comprises a mirror associated with each camera of said second set.

6. The arrangement of claim 1 wherein said mirror is a half-silvered mirror whose edges are located outside the aggregate fields of view of all the cameras.

7. The arrangement of claim 2 wherein said one or more cameras of said first set are located in a first plane, said one or more cameras of said second set are located in a second plane, and wherein said arrangement comprises additional mirror means associated with the cameras of the second set for providing a second reflection for light reflected by said half-silvered mirror to avoid image reversal in each camera of said second set.

8. The arrangement of claim 1 wherein said first set comprises one camera and said second set comprises one camera, wherein said aggregate field of view comprises said field of view of said one camera of said first set merged continuously with said field of view of said one camera of said second set, and wherein said mirror is a half-silvered mirror oriented by 45° to a line which bisects the aggregate field of view.

9. The arrangement of claim 8 further comprising a second mirror to provide an additional reflection for the light reflected by said half-silvered mirror.

10. A video camera arrangement comprising a first set of one or more video cameras and a second set of one or more video cameras, a mirror for separating light from an object to be imaged into first and second portions, wherein said mirror allows passage therethrough of a first portion of the light and reflects a second portion of the light, said first set of one or more cameras receiving the first light portion and said second set of one or more cameras receiving the second light portion and the fields of view of individual cameras of said first and second sets being combined alternately to form a single aggregate field of view including said object, the field of view of each camera of each set merging contiguously at a boundary with the field of view of a camera of the other set.

11. The arrangement of claim 10 wherein said mirror is a half-silvered mirror which allows passage therethrough of said first portion of said light to said one or more cameras of said first set and which reflects said second portion of said light to said one or more cameras of said second set, said half-silvered mirror having edges located outside said aggregate field of view.

12. The arrangement of claim 11 wherein said first set comprises one camera, said second set comprises one camera, and wherein said half-silvered mirror is oriented at 45° to a line which bisects said aggregate field of view.

13. The arrangement of claim 11 wherein said one or more cameras of said first set are located in a first plane, said one or more cameras of said second set are located in a second plane, and said arrangement includes a mirror associated with each camera of the second set for providing a second reflection for light reflected by said half-silvered mirror to avoid image reversal in the one or more cameras of the second set.

14. A video camera arrangement comprising a plurality of individual video cameras having individual fields of view which merge continuously to form a single aggregate field of view, said arrangement comprising a mirror for receiving incident light, for allowing passage therethrough of a first portion of said light incident thereon and for reflecting a second portion of said light incident thereon, a first set of one or more video cameras having individual fields of view for receiving at least some of the light passing through said mirror, and a second set of one or more video cameras having individual fields of view for receiving at least some of the light reflected by said mirror, the cameras in said first and second sets being positioned so that the aggregate field of view is formed by alternating the individual fields of view of the individual cameras of the first and second sets, the field of view of each camera of each set merging continuously along a boundary with a field of view of a camera of the other set.

15. A video camera arrangement comprising a first set of one or more video cameras and a second set of one or more video cameras, and a mirror for separating light incident thereon from an object to be imaged into first and second portions, said mirror allowing passage therethrough of said first portion of said light incident thereon and said mirror reflecting said second portion of said light incident thereon, said first set of one or more cameras receiving the first light portion and said second set of one or more cameras receiving the second light portion and the fields of view of individual cameras of said first and second sets being combined alternately to form a single aggregate field of view including said object, the field of view of each camera of each set merging contiguously at a boundary with the field of view of a camera of the other set.

* * * * *